Figure 1:
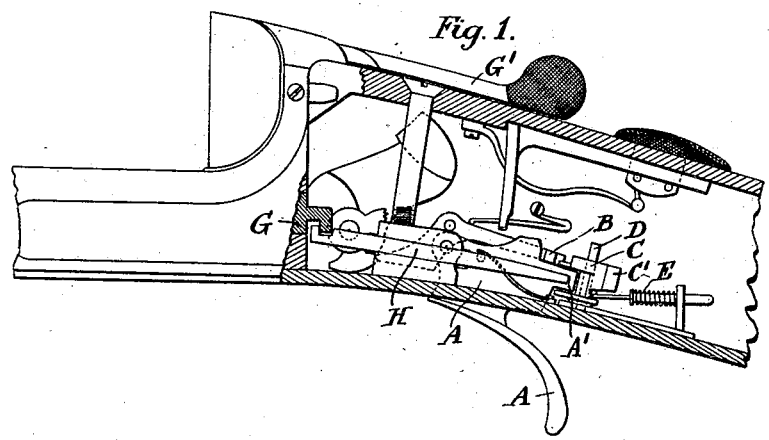

(No Model.)  6 Sheets—Sheet 1.

J. ROBERTSON.
SINGLE TRIGGER MECHANISM FOR DROP DOWN GUNS.

No. 582,094. Patented May 4, 1897.

Witnesses:
S. M. Dorsett,
Louis F. Abell

Inventor:
John Robertson
By F. C. Somes
Attorney.

(No Model.)  
6 Sheets—Sheet 2.

J. ROBERTSON.
SINGLE TRIGGER MECHANISM FOR DROP DOWN GUNS.

No. 582,094.  
Patented May 4, 1897.

Witnesses:
S. M. Dosett,
Louis F. Abell.

Inventor
John Robertson
By F. C. Somes,
Attorney.

(No Model.)
J. ROBERTSON.
SINGLE TRIGGER MECHANISM FOR DROP DOWN GUNS.
No. 582,094.
6 Sheets—Sheet 3.
Patented May 4, 1897.
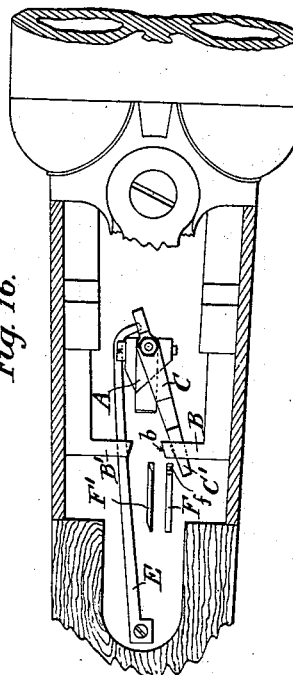
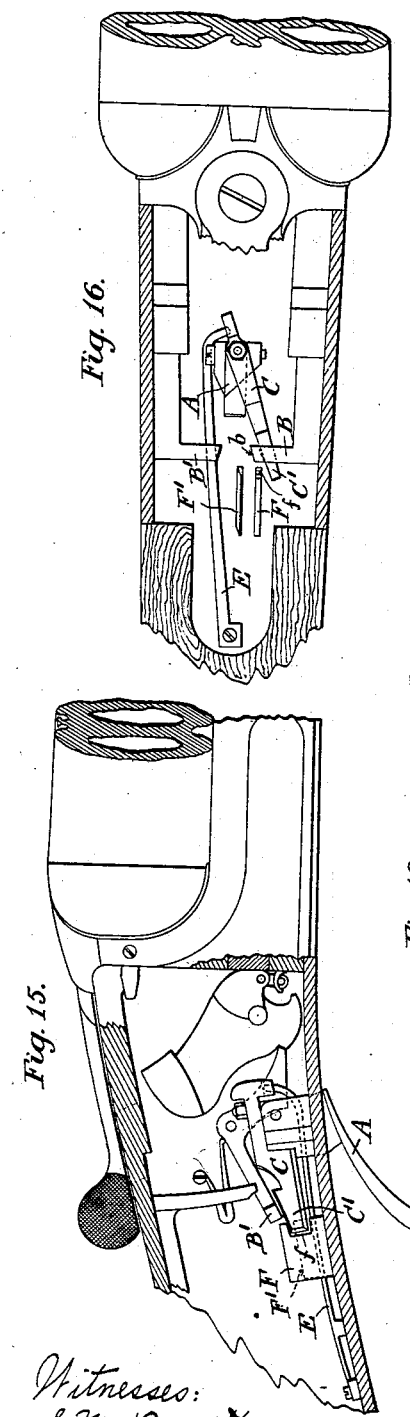
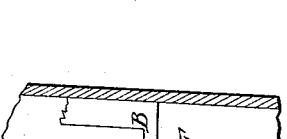
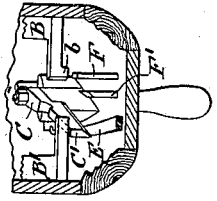
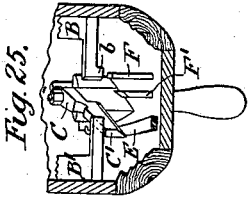
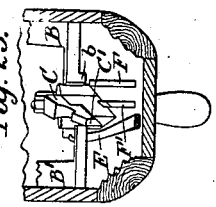
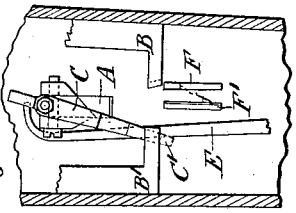
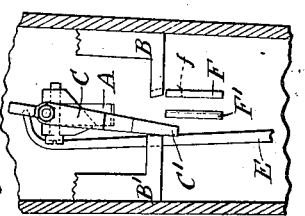
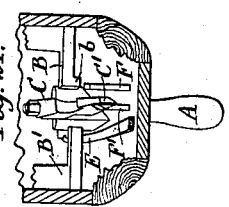
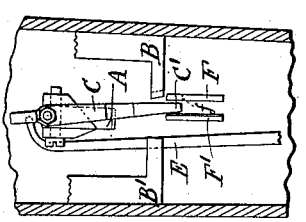
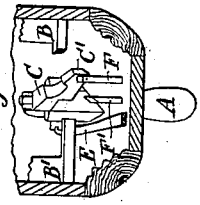
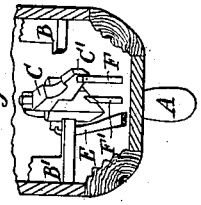
Witnesses:
S. M. Dorsett,
Lewis F. Abell
Inventor:
John Robertson
By F. C. Somes
Attorney.

(No Model.) 6 Sheets—Sheet 4.

J. ROBERTSON.
SINGLE TRIGGER MECHANISM FOR DROP DOWN GUNS.

No. 582,094. Patented May 4, 1897.

Witnesses:
S. M. Dorsett,
Louis F. Abel

Inventor:
John Robertson,
By F. C. Somes,
attorney.

(No Model.)
6 Sheets—Sheet 5.
J. ROBERTSON.
SINGLE TRIGGER MECHANISM FOR DROP DOWN GUNS.
No. 582,094.    Patented May 4, 1897.
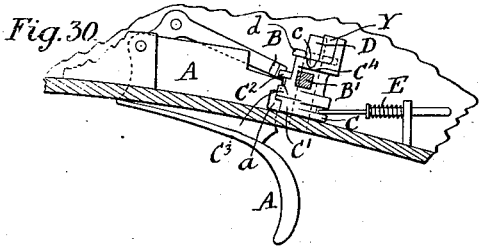
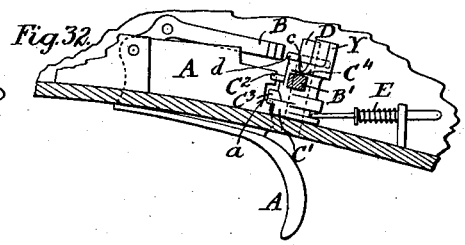
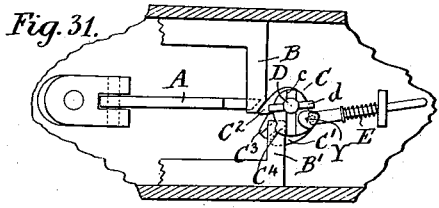
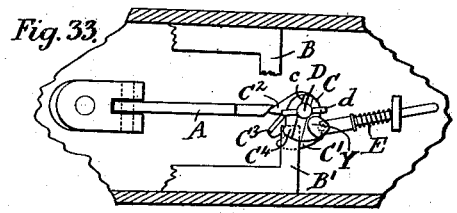
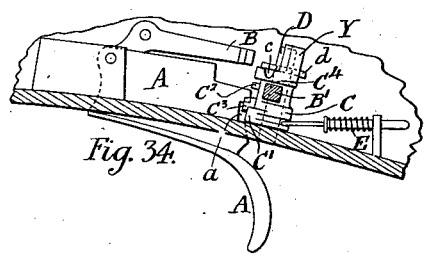
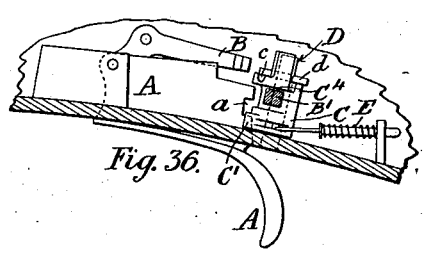
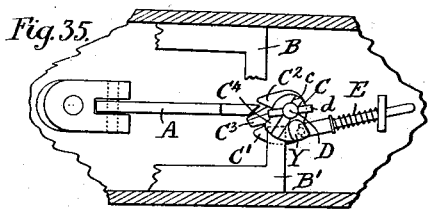
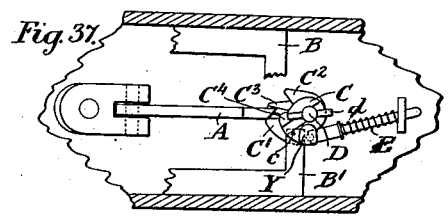
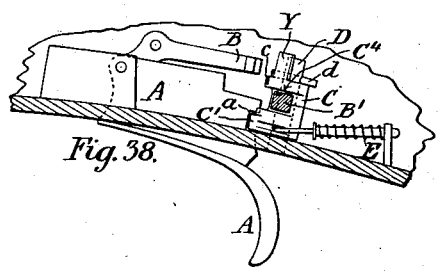
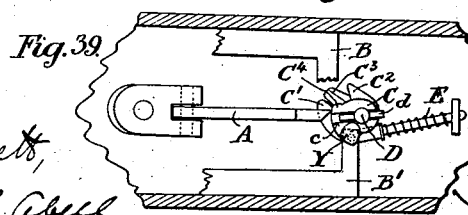
Witnesses:
S. M. Dorsett,
Lewis F. Abell
Inventor:
John Robertson
By H. C. Somes
Attorney (No Model.)

J. ROBERTSON.
SINGLE TRIGGER MECHANISM FOR DROP DOWN GUNS.

No. 582,094. Patented May 4, 1897.

6 Sheets—Sheet 6.

UNITED STATES PATENT OFFICE.

JOHN ROBERTSON, OF LONDON, ENGLAND.

SINGLE-TRIGGER MECHANISM FOR DROP-DOWN GUNS.

SPECIFICATION forming part of Letters Patent No. 582,094, dated May 4, 1897.

Application filed April 19, 1895. Serial No. 546,421. (No model.) Patented in England March 21, 1894, No. 5,897, and November 26, 1894, No. 22,894; in France April 18, 1895, No. 246,719, and in Belgium April 18, 1895, No. 115,125.

*To all whom it may concern:*

Be it known that I, JOHN ROBERTSON, a subject of the Queen of Great Britain, residing at London, in the county of Middlesex, England, have invented certain new and useful Improvements in Drop-Down Guns, (for which I have obtained patents in the following countries, to wit: Great Britain, No. 5,897, dated March 21, 1894, and No. 22,894, dated November 26, 1894; France, No. 246,719, dated April 18, 1895, and Belgium, No. 115,125, dated April 18, 1895,) of which the following is a specification.

The present invention relates to drop-down guns, the two barrels of which can be fired in succession by the action of a single trigger, this effect being produced by causing the first pull of the trigger, which fires one barrel, to shift or move a part in the action, so as to bring it into the necessary position for acting on the sear of the other barrel when the trigger is again pulled. In practice I have found that in the act of making the first pull on the trigger an involuntary action of the firing-finger frequently occurs and which results in relaxing the pressure slightly on the trigger and then immediately pulling the trigger hard again. The effect of this is to allow the trigger to descend sufficiently, so that when the subsequent hard pull comes the shifting part (which has already moved so that it engages the second sear) will act on the second sear, and both barrels are thus discharged practically simultaneously, the second one, of course, unintentionally.

The object of the present invention is to prevent this occurring, and while the means I employ may be varied to suit different constructions, they consist, essentially, in the use of an intercepter which acts in conjunction with the movable part, which is shifted by the first pull of the trigger, so that the latter cannot effect its complete movement, which is requisite to cause it to engage the second sear until the trigger has been first pulled to effect the firing of the first barrel and after the involuntary pull has occurred.

As above stated, the invention is capable of realization in various ways, but in all cases the essential feature consists in the use of suitably-shaped surfaces formed on the shifting part and which act in conjunction with correspondingly-shaped surfaces formed either on the trigger itself or on one of the sears or on a fixed part of the action and which prevent the full movement of the shifting part until after the trigger has been once raised and the involuntary movement (due to the recoil) has occurred, and the trigger then allowed to descend again to its full extent—that is to say, that if both hammers are cocked without charging the barrels, in order to release the two hammers in succession three distinct pulls of the trigger would be necessary, the first pull at once releasing the hammer of the first barrel, the second pull (which in the case of the gun being loaded would be effected by the recoil and the extent of which pull may be either a full pull or any portion thereof) would have no effect with regard to the releasing of the second hammer, but simply permit the shifting part to move to the requisite position for enabling same to release such second hammer when the third pull on the trigger is effected. The return movement of the shifting part to its original position is effected by the action of opening and closing the gun for charging, and may be produced through any suitable connection, either directly with the locking-bolt of the barrels or with the lever actuating same or through the intermediary of the safety-bolt when same is employed, or directly from the safety-bolt. The shifting part is also preferably provided with a projection which absolutely blocks the sear of the second barrel by being situated in the path of travel of same in its movement, which is necessary to release the hammer it locks or retains, until after the first barrel has been fired, so that the shock of the recoil due to such discharge cannot possibly release the sear of the second barrel; but in order that my invention may be fully understood, I will now proceed to describe same by the aid of the accompanying sheets of drawings, in which—

Figure 2:
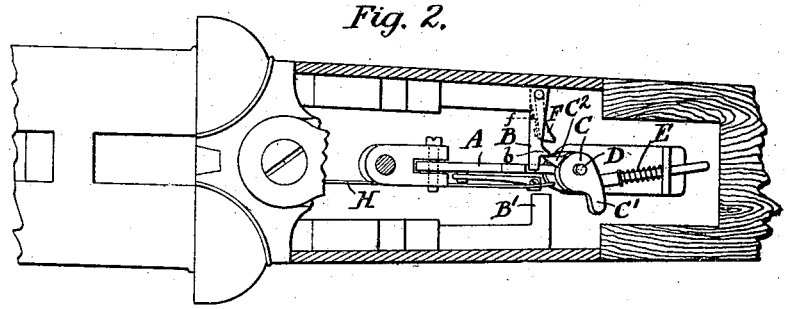
Figure 3:
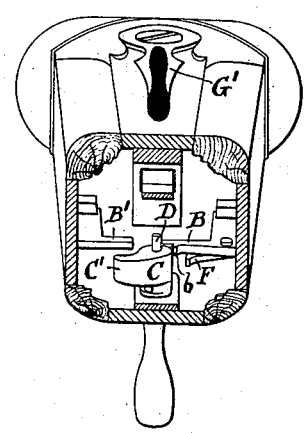
Figure 4:
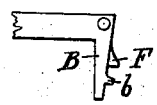

Figure 1 is a longitudinal section of the lock of a gun with one arrangement for applying my invention thereto; Fig. 2, a horizontal section thereof; Fig. 3, a transverse section through the lock; Fig. 4, a plan view of the top side of the end of one of the sears; Fig.

Figure 6:
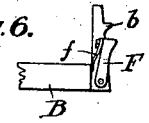
Figure 27:
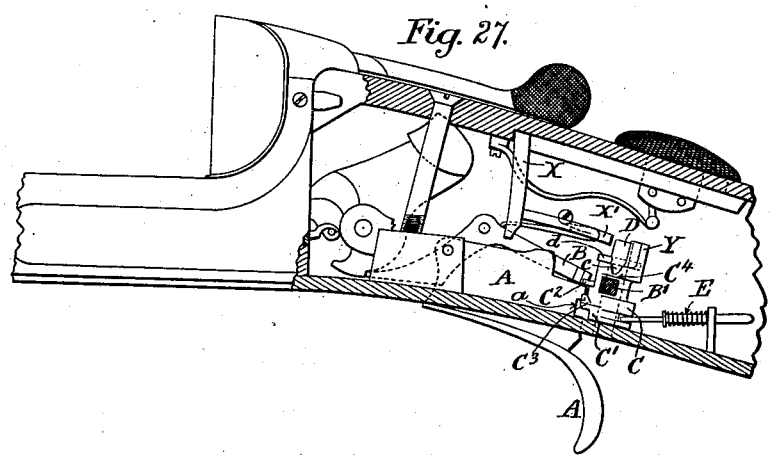
Figure 28:
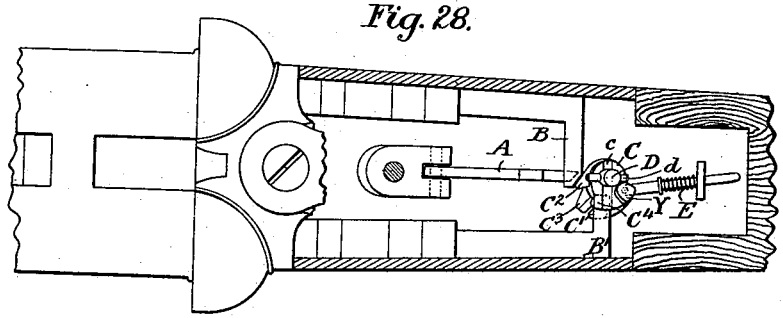
Figure 29:
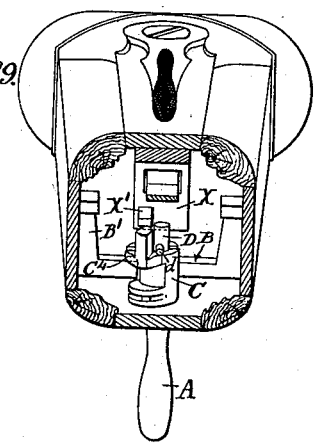
Figure 40:
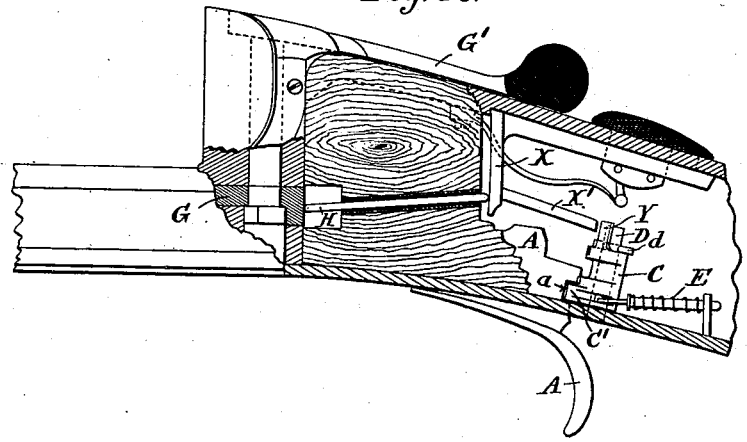
Figure 41:
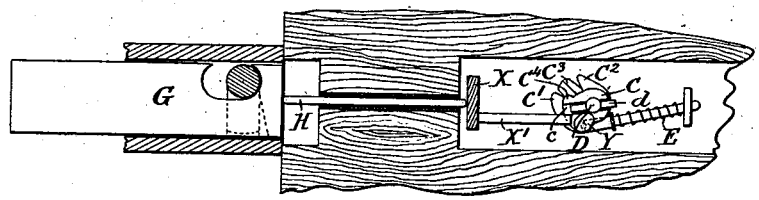

5, a side elevation of same, and Fig. 6 a plan view of the under side of such sear. Figs. 7 to 14 are detail views showing the parts in the different positions they occupy during the complete action of discharging both barrels of the gun, each position being shown in side elevation and in plan, respectively. Figs. 15 to 26, inclusive, illustrate the application of my invention by means of a stationary intercepter fixed on the trigger-plate, so as to always discharge the same barrel of the gun by the first pull of the trigger after the gun has been reloaded, Fig. 15 being a longitudinal section of such arrangement, Fig. 16 a sectional plan view of same, and Figs. 17 to 26 being detail views showing the parts in the different positions they occupy, each position being shown in end elevation and in plan, respectively. Figs. 27 to 39, inclusive, illustrate a slightly-modified form of my invention, in which both the intercepter and the projection for blocking the sear of the second barrel are employed, Fig. 27 being a longitudinal section of such arrangement, Fig. 28 a sectional plan view of same, Fig. 29 a transverse section thereof, and Figs. 30 to 39 being detail views showing the parts in the different positions they occupy, each position being shown in side elevation and in plan, respectively. Fig. 40 is a longitudinal section of a lock, showing one arrangement for returning the shifting part (which enables the second barrel to be discharged) back to its original position by the action of opening the gun. Fig. 41 is a sectional plan view of same with the parts in one position, and Fig. 42 a corresponding view with the parts in another position.

Figure 5:
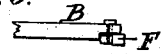

In the arrangement illustrated in Figs. 1 to 14 A is the single trigger, over the top of which the end of the sear B for firing the right-hand barrel is situated, so that the pulling of the trigger will effect such firing of this barrel in the usual manner. The shifting part or tumbler C, by means of which the second barrel is discharged, is mounted so that it can turn on a pivot D, and is acted upon by any suitable spring, such as E, continuously tending to throw it to the position shown in Figs. 13 and 14, where a projection or arm C' on such tumbler is situated under the end of the sear B' of the left-hand barrel. A projection A' on the rear of the trigger engages a recess in the tumbler C, and as the latter, as well as turning on its pivot D, can also rise vertically thereon, it will be seen that when the parts are in the position shown in Figs. 13 and 14 a pull on the trigger will, by raising tumbler C, cause its arm C' to raise the sear B' and so release the hammer of the left-hand barrel. The tumbler C also has a second arm or projection $C^2$, which, when both hammers are cocked, bears against a corresponding projection or abutment $b$ on the right-hand sear B, as shown in Figs. 1, 2, 3, 7, and 8, so that the spring cannot cause the tumbler to turn on its pivot D. The sear B is also provided with an intercepting projection or abutment F, (shown in detail in Figs. 4 to 6,) which is pivoted to such sear and is acted upon by a spring $f$, normally acting to force it outward.

The action is as follows: The gun being loaded and both hammers cocked, when the parts are in the position shown in Figs. 7 and 8, the first pull of trigger A by raising the sear B fires the right-hand barrel. Upon the pull on the trigger being relaxed, owing to the recoil, as the sear B remains raised, while the trigger, and with it the tumbler C, descends, the arm $C^2$ on the latter will clear the abutment $b$ on the sear B, and the tumbler C then turns slightly on its pivot D, under the action of spring E, to the position shown in Figs. 9 and 10, until its arm $C^2$ comes in contact with and is arrested by the intercepter F on the sear B. The tumbler C cannot consequently turn sufficiently on its pivot D to enable its arm C' to come under the left-hand sear B', so that if an involuntary pull of the trigger A occurs the left-hand barrel will not be discharged. When the trigger A is allowed to descend farther, the arm $C^2$ of the tumbler C then clears the intercepter F, and the tumbler, under the action of its spring E, then turns to the position shown in Figs. 11 and 12. In this position the arm C' of tumbler C comes in contact with the end of the left-hand sear B', and the tumbler consequently still cannot turn to its full extent, and it is only when the trigger A, and with it the tumbler C, has descended right down, (by the pull on the former being completely removed,) and whereby the arm C' clears the end of the sear B', that such arm can pass under this sear to the position shown in Figs. 13 and 14. When this has occurred, the next time the trigger A is pulled the sear B' will be raised by the arm C' and the left-hand barrel then be discharged.

Figure 7:
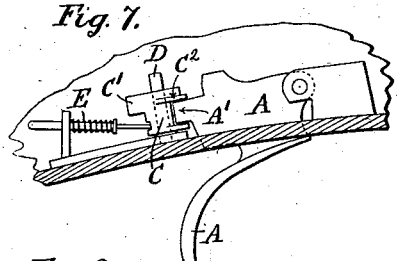
Figure 9:
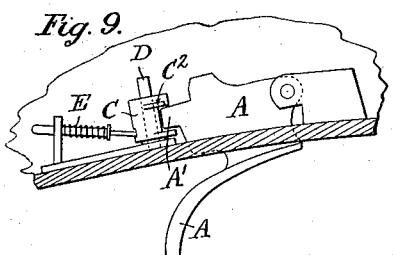
Figure 8:
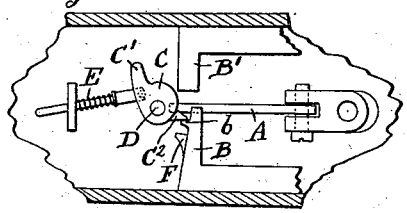
Figure 10:
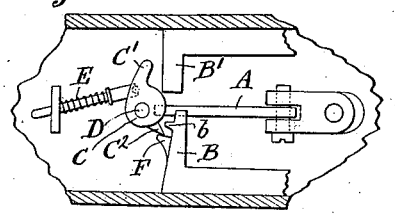
Figure 11:
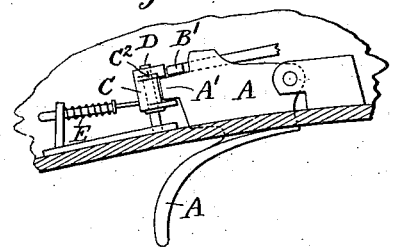
Figure 13:
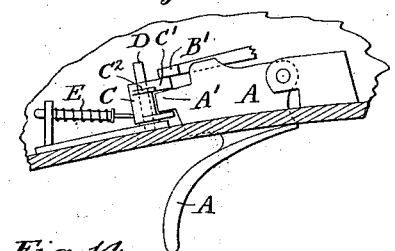
Figure 12:
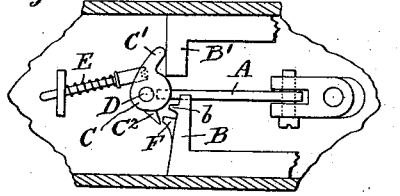
Figure 14:
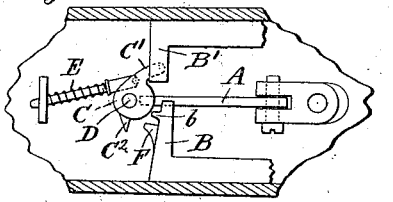

To return the tumbler C to its original position after the left-hand barrel has been discharged, the end of the locking-bolt G, when actuated in the usual way by the lever G' for the purpose of opening the gun, will, in its backward movement, force back a sliding rod H, which it engages, as shown in Figs. 1 and 2, the movement bringing the rear end of such rod against one side of the tumbler C and causing it to turn on its pivot D to the position shown in Figs. 7 and 8, and as the action of opening the gun will in the usual way have cocked the hammers, and consequently depressed the rear ends of the sears B B', the arm $C^2$ will again abut against the projection $b$ on the sear B and hold the tumbler C in the position to which it has been shifted.

Referring now to the arrangement illustrated in Figs. 15 to 26, inclusive, of the drawings, in this arrangement the tumbler $C^{10}$ is pivoted to the upper forward end of the trigger $A^{10}$ and is acted upon by the spring $E^{10}$, tending to force it to the position shown in Figs. 25 and 26, while the intercepter is fixed to the trigger-plate and consists of two vertical plates $F^{10}$ $F^{11}$, as shown. When the tumbler $C^{10}$ is in the position shown in Figs. 15, 16, 17, and 18, the rear end $C^{11}$ of such tumbler is beneath the right-hand sear $B^{10}$ and is retained in such position by engaging the notch or projection $b^{10}$ on the under side of such sear, as shown in Fig. 17, so that when the trigger $A^{10}$ is pulled and the tumbler $C^{10}$ consequently raised the arm or end $C^{11}$ thereof will raise the right-hand sear and so discharge the barrel on that side. Upon the pull of the trigger being relaxed the tumbler $C^{10}$ will descend and its arm $C^{11}$ clear the projection $b^{10}$ on the sear $B^{10}$, which latter remains raised. The tumbler $C^{10}$ will then, by the action of the spring $E^{10}$, turn slightly on its pivot until its arm $C^{11}$ is arrested by coming in contact with the first plate $F^{10}$ of the intercepter, as shown in Figs. 19 and 20. This plate $F^{10}$ has a recess or cut-away part $f^{10}$, and when the trigger is allowed to descend farther the arm $C^{11}$ of the tumbler $C^{10}$ comes opposite such recess or cut-away portion, so that such tumbler can then turn farther on its pivot until the arm $C^{11}$ is again arrested by coming in contact with the second plate $F^{11}$ of the intercepter, as shown in Figs. 21 and 22. Upon the involuntary pull being exerted on the trigger $A^{10}$ the arm $C^{11}$ of the tumbler will be raised clear of the top edge of the plate $F^{11}$ of the intercepter and the tumbler will then turn farther on its pivot until its arm $C^{11}$ is arrested by coming in contact with the end of the left-hand sear $B^{11}$, as shown in Figs. 23 and 24. Upon the trigger being then released the arm $C^{11}$ will clear the end of the sear $B^{11}$ and by the tumbler turning to its full extent on its pivot $D^{10}$ such arm $C^{11}$ will come under the left-hand sear $B^{11}$, as shown in Figs. 25 and 26, so that when the trigger is again pulled such sear will be raised and the left-hand barrel consequently discharged.

For the sake of clearness the arrangement for returning the tumbler to its original position when the gun is opened is not shown, but it may be of similar construction to that described in connection with the arrangement illustrated in Figs. 1 to 14.

Referring now to the arrangement shown in Figs. 27 to 39, inclusive, in this case the tumbler $c^{20}$ can only rise after the same has turned on its pivot to the position for firing the left-hand barrel instead of rising with each pull of the trigger, as in both of the arrangements previously described, and, further, such tumbler is provided with an arm which remains over the sear of the left-hand barrel, so that same can only rise when the tumbler rises, so that the left-hand sear is blocked or locked and prevented from accidentally rising and firing the left-hand barrel until this position of the tumbler is attained.

When the parts are in the position shown in Figs. 27 to 31, inclusive, of the drawings, the end of the right-hand sear $B^{20}$ being over the trigger $A^{20}$, when the latter is pulled such sear would be raised and the right-hand barrel consequently discharged. Until this occurs the arm $C^{21}$ of tumbler $C^{20}$ is in contact with the end of sear $B^{20}$, and the tumbler $C^{20}$ is consequently prevented from turning on its pivot under the action of its spring $E^{20}$. As soon as the sear $B^{20}$ is raised the arm $C^{21}$ of the tumbler $C^{20}$ clears the end of the sear $B^{20}$, and the tumbler $C^{20}$ turns on its pivot until the arm $C^{21}$ comes in contact with the end of the trigger $A^{20}$, as shown in Figs. 32 and 33. Upon the trigger being allowed to descend, the arm $C^{21}$ clears the end of the trigger $A^{20}$ and the tumbler $C^{20}$ turns farther on its pivot until another arm $C^3$ on the tumbler comes in contact with the end of such trigger, as shown in Figs. 34 and 35. When the involuntary pull on the trigger occurs, a recess or cut-away portion $a$ of the trigger comes opposite the arm $C^3$ of the tumbler, and the latter then turns farther on its pivot until the arm $C^{21}$ of the tumbler comes in contact with the end of such trigger, as shown in Figs. 36 and 37, and the further movement of the tumbler on its pivot is consequently arrested. When the pull on the trigger is released, the cut-away portion $a$ comes opposite the arm $C^{21}$ of the tumbler, which can then turn to the full extent on its pivot, so as to bring the rear portion of the arm $C^{21}$ under the left-hand sear $B^{21}$ to the position for discharging the left barrel, as the forward end of the arm $C^{21}$ then engages the recess or cut-away portion $a$ of the trigger, while its backward end is under the left-hand sear $B^{21}$, and the action of the tumbler turning to this position has brought a slot $c$, made in the upper surface of such tumbler, opposite a cross-pin $d$, inserted in the pivot $D^{20}$, on which the tumbler turns. When the trigger is again pulled, the tumbler will be raised, and by acting on the sear $B^{21}$ will discharge the left-hand barrel. As the tumbler $C^{20}$ is at its upper end provided with an arm or projection $C^4$, which always remains over the left-hand sear $B^{21}$, the latter will be always locked thereby and can only rise with the tumbler, so that the left-hand sear is effectually blocked or locked until the tumbler assumes the position for discharging the left-hand barrel.

The arrangement shown for effecting the return of the tumbler to its original position in the construction last described consists of an arm $X'$ on the safety-bolt $X$, which, when shifted back, comes over the trigger $A^{20}$, so as to prevent the same being pulled, such arm $X'$ acting on a projection $Y$ on one side of the center of the tumbler $C^{20}$, when the safety-bolt is moved backward, so that the action of placing the gun at safety will return the tumbler $C^{20}$ to its original position.

Figure 42:
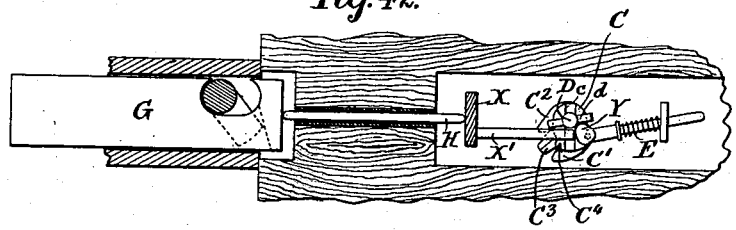

The safety-bolt $X$ is preferably actuated automatically by the action of opening the gun by the arrangement shown in Figs. 40 to 42 of the drawings, in which the end of the locking-bolt G, when operated in the usual manner by the lever G', would, in its backward movement, force back the sliding rod H, the rear end of which bears against the safety-bolt X, and so also force the latter backward to the safety position, whereby the arm X' of such safety-bolt, acting on the projection Y of the tumbler $C^{20}$, will return same to its original position, and as the gun will be recocked in the usual way by opening it, the sears will have descended to their original position, and the tumbler $C^{20}$ will consequently be prevented from turning on its pivot. When the safety-bolt X is shifted forward to permit of the gun being again fired, it will release the tumbler $C^{20}$, so that the same will again be free to turn when the trigger is actuated in the manner previously described.

What I claim, and desire to secure by Letters Patent, is—

1. In a single-trigger double-barrel gun, the combination of two sears, a horizontally-oscillating sear-actuator, a trigger for the first sear and said sear-actuator, means for holding said sear-actuator out of operative connection with the second sear during the firing and recoil of the first barrel, and means for causing said actuator to engage the second sear after the recoil of the first barrel.

2. In a single-trigger double-barrel gun, the combination of two sears, a sear-actuator, a trigger for the first sear and said sear-actuator, means for locking said actuator out of operative connection with the second sear during the firing and recoil of the first barrel, means for causing said actuator to engage the second sear after the recoil of the first barrel, and means connected with the locking-bolt of the gun-barrel for restoring said actuator to normal position.

3. In a single-trigger double-barrel gun, the combination of two sears, a swiveled spring-actuated actuator for the second sear, a trigger for successively operating the first sear and said sear-actuator, and a lock for locking said sear-actuator out of operative connection with the second sear during the firing and recoiling of the first barrel.

4. In a single-trigger double-barrel gun, the combination of two sears, a swiveled vertically-sliding spring-actuated actuator for the second sear, a trigger for successively operating the first sear and said sear-actuator, and a lock for locking said sear-actuator out of operative connection with the second sear during the firing and recoiling of the first barrel.

5. In a single-trigger double-barrel gun, the combination of two sears, a sear-actuator for the second sear provided with intercepting arms, a trigger for actuating the first sear and said sear-actuator, abutments or arms engaging said arms on the sear-actuator for holding it out of operative connection with the second sear during the firing and recoiling of the first barrel, and means for releasing said sear-actuator after the recoil of the first barrel and causing it to engage the second sear.

6. In a single-trigger double-barrel gun, the combination of two sears, the first of which is provided with abutments or arms, a sear-actuator for the second sear provided with an intercepting arm, a trigger for actuating the first sear and said sear-actuator, said abutments or arms on the first sear being adapted to engage said arm on the sear-actuator for holding it out of operative connection with the second sear during the firing and recoiling of the first barrel, and means for disengaging said abutments or arms after the recoil of the first barrel and causing the sear-actuator to engage the second sear.

7. In a single-trigger double-barrel gun, the combination of two sears, a sear-actuator having an intercepting arm adapted to engage the first sear, means for automatically shifting said actuator into engagement with the second sear, and means for holding said intercepting arm in engagement with said first sear until after the firing and recoil of the first barrel.

8. In a single-trigger double-barrel gun, the combination of two sears, a sear-actuator having an intercepting arm adapted to engage the first sear, means for automatically shifting said actuator into engagement with the second sear, means for holding said intercepting arm in engagement with said first sear until after the firing and recoil of the first barrel, and a projecting arm on said sear-actuator adapted to operate the second sear after the firing and recoil of the first barrel.

9. In a single-trigger double-barrel gun, the combination of two sears, the first of which is provided with a fixed abutment or arm, and, with a spring-actuated pivoted abutment, a sear-actuator provided with an intercepting arm adapted to engage successively the fixed abutment and the pivoted abutment on the first sear, and means for releasing said intercepting arm from said abutments after the firing and recoil of the first barrel.

JOHN ROBERTSON.

Witnesses:
CHAS. A. ALLISON,
HARRY A. MCLELLAN.